(12) United States Patent
Bensberg et al.

(10) Patent No.: US 7,770,374 B2
(45) Date of Patent: Aug. 10, 2010

(54) NON-WARPING CHAIN LINK

(75) Inventors: Jochen Bensberg, Hilchenbach (DE); Heiner Samen, Marienheide (DE); Jörg Schulz, Engelskirchen (DE)

(73) Assignee: Kabelschlepp GmbH, Wenden-Gerlingen (DE)

( * ) Notice: Subject to any disclaimer, the term of this patent is extended or adjusted under 35 U.S.C. 154(b) by 0 days.

(21) Appl. No.: 12/225,463

(22) PCT Filed: Mar. 16, 2007

(86) PCT No.: PCT/EP2007/002328
§ 371 (c)(1),
(2), (4) Date: Nov. 21, 2008

(87) PCT Pub. No.: WO2007/110160
PCT Pub. Date: Oct. 4, 2007

(65) Prior Publication Data
US 2009/0107104 A1    Apr. 30, 2009

(30) Foreign Application Priority Data
Mar. 24, 2006   (DE) .................. 10 2006 013 682

(51) Int. Cl.
*F16G 13/16* (2006.01)
(52) U.S. Cl. .................. 59/78.1; 248/49; 248/51; 59/900
(58) Field of Classification Search .................. 59/78.1, 59/900; 248/49, 51
See application file for complete search history.

(56) References Cited

U.S. PATENT DOCUMENTS

| | | | | |
|---|---|---|---|---|
| 5,638,672 A * | 6/1997 | Furukawa | .................. | 59/78.1 |
| 5,724,803 A * | 3/1998 | Pea | .................. | 59/78.1 |
| 5,768,882 A * | 6/1998 | Weber et al. | .................. | 59/78.1 |
| 5,987,873 A * | 11/1999 | Blase | .................. | 59/78.1 |
| 5,996,330 A * | 12/1999 | Ehmann et al. | .................. | 59/78.1 |
| 6,094,902 A * | 8/2000 | Drews et al. | .................. | 59/78.1 |
| 6,167,689 B1 * | 1/2001 | Heidrich et al. | .................. | 59/78.1 |
| 7,204,075 B2 * | 4/2007 | Utaki | .................. | 59/78.1 |
| 7,249,452 B2 * | 7/2007 | Komiya | .................. | 59/78.1 |

(Continued)

FOREIGN PATENT DOCUMENTS

DE    196 45 403 A1    5/1998

(Continued)

OTHER PUBLICATIONS

PCT/IB/338, Notification of Transmittal of Translation of the International Preliminary Report on Patentability received Dec. 4, 2008, 1 p.

(Continued)

*Primary Examiner*—David B Jones
(74) *Attorney, Agent, or Firm*—Smith Law Office

(57) ABSTRACT

The subject matter of the invention is a chain link of an energy-guiding chain for guiding cables, lines, hoses and the like between a positionally fixed connection point and a moveable connection point, wherein the chain link is formed in one piece from at least one plastic by two lugs, which are arranged spaced apart from one another, and at least one transverse web which connects the lugs by means of a connecting region. At least one of the lugs has at least one recess which is formed adjacent to the connecting region.

3 Claims, 3 Drawing Sheets

U.S. PATENT DOCUMENTS 7,290,384 B2 * 11/2007 Weber et al. .................. 59/78.1

FOREIGN PATENT DOCUMENTS

| DE | 197 10 663 A1 | 9/1998 |
| DE | 197 39 782 A1 | 4/1999 |
| DE | 101 15 566 C1 | 12/2002 |
| WO | WO 98/22728 | 5/1998 |
| WO | WO 2005/108820 A1 | 11/2005 |

OTHER PUBLICATIONS

PCT/IB/373, International Preliminary Report on Patentability received Dec. 4, 2008, 1p.

PCT/ISA/237, Written Opinion of the International Searching Authority received Dec. 4, 2008, 6pp.

English language Translated Description and Claims of WO 98/22728, European Patent Office's esp@cenet.com database, 3pp., May 1998.

English language Translated Description and Claims of WO 2005/108820 A1, European Patent Office's esp@cenet.com database, 6pp., Nov. 2005.

English language Abstract, Translated Description and Claims of DE 101 15 566 C1, European Patent Office's esp@cenet.com database, 4pp., Dec. 2002.

English language Abstract, Translated Description and Claims of DE 196 45 403 A1, European Patent Office's esp@cenet.com database, 4pp., May, 1998.

English language Abstract, Translated Description and Claims of DE 197 10 663 A1, European Patent Office's esp@cenet.com database, 4pp., Sep. 1998.

English language Abstract, Translated Description and Claims of DE 197 39 782 A1, European Patent Office's esp@cenet.com database, 3pp., Apr. 1999.

* cited by examiner

NON-WARPING CHAIN LINK

FIELD AND BACKGROUND OF THE INVENTION

The subject of the invention concerns a chain link of an energy drag chain as well as an energy drag chain for the guiding of cables, conduits, tubes or similar.

For the guidance of cables, conduits, tubes or similar between a fixed and a mobile connecting point, so-called energy drag chains are used. The energy drag chain is formed by a multiple number of chain links. The chain links are joined together in an articulated manner. Each chain link has two link plates. The link plates are connected together with at least one cross piece. The link plates and the cross pieces form a channel in which conduits, cables, tubes or similar are arranged.

The design of the chain links can vary. Chain links are known in which the cross pieces are connected to the link plates separably. By variation of the length of the cross pieces, the width of the energy drag chain can be adjusted to the requirements.

From WO 98/22728 a chain link is known that is made from plastic. The chain link has two link plates that are arranged at a distance from one another. The link plates are connected with a cross piece, whereby the link plates and one cross piece form U-shaped bodies. Another cross piece is connected separably to at least one link plate so that conduits can be introduced into the chain link by opening of the cross piece.

The problem in such a chain link is that due to the manufacturing technology, angular deviations of the link plates may occur that could lead to a reduction of the overall internal height. Moreover, an adverse influence on the functionality of the connection may occur due to pressing forces that act on the connections between the link plates and the separable cross piece.

SUMMARY OF THE INVENTION

Based on this, the task of the present invention is to reduce the manufacturing tolerances.

The chain link according to the invention of an energy drag chain for the guidance of cables, conduits, tubes and similar between a fixed and a mobile connecting point comprises two link plates that are arranged at a distance to one another and at least one cross piece that joins the link plates over a bonding region. The link plates and the cross piece are made of one piece from plastic. According to the proposal according to the invention, at least one link plate has at least one recess, which is formed near the connecting region.

Through this measure, the manufacturing tolerances are reduced. Specifically, a higher angular accuracy of the link plates with respect to the cross piece is achieved so that an essentially constant internal clear height within the chain link is achieved.

The recess can be formed, for example, by appropriate replaceable inserts in a tool. This means that no separate tools are necessary, for example, in order to able to manufacture an open and/or closed version of the chain link. Another advantage of the chain link according to the invention can be regarded to lie in the fact that a cost-effective slanted position of the side link plates in the tool is not necessary. Specifically, by replacement of the replaceable inserts, the shape and depth of the recess can be varied depending on the plastic used so that the recess can be adjusted to the starting material.

As determined through the manufacture of the chain link according to the invention, expensive subsequent treatments of a chain link can also be omitted.

Preferably, at least one recess is formed on the outside of the at least one link plate. As a result of this, simplified manufacture of the chain link is achieved. Alternatively, the recess can be formed on the inside of the at least one link plate.

Depending on the size of the chain link, it may be expedient to provide recesses both on the inside and on the outside in order to further reduce the manufacturing tolerances.

If a recess is provided on the inside of the at least one link plate, then preferably the recess is designed so that the edge of the recess surrounds the connection region at least partly.

Surprisingly, it was found that by a selection of the relationship between the at least one recess and the thickness of the link plate warping can be reduced. Preferably the recess represents at least 30% and at most 80% in relation to the link plate thickness. A ratio of 50% is especially preferable. Hereby a recess can be provided both on the outside as well as on the inside of the link plate. In the design of the recess, it is not absolutely necessary that the recess have a contour or a surface that corresponds to the contour of the cross piece or to the cross piece surface of the cross piece. The recess, can have a surface that is smaller or larger than the cross-sectional surface of the cross piece, especially on the outside. It can correspond to the cross piece.

According to a still further advantageous embodiment of the invention, it is proposed that the recess be formed essentially in a triangular shape. Hereby the base of the triangular recess lies substantially parallel to the cross piece.

According to a further inventive idea, a chain link of an energy drag chain for the guidance of cables, conduits, tubes and similar between a fixed and a mobile connecting point is provided, whereby the chain link is made in one piece from a plastic from two link plates arranged at a distance from one another and of at least one cross piece that connects the link plates along a connection region, whereby at least one link plate has at least one protrusion that is formed on the outer side of the link plate and essentially opposite the cross piece. The behavior of the chain link during cooling will be positively influenced by this protrusion in the sense that the angular accuracy is increased.

The length of the protrusion is preferably smaller than the length of the cross piece. The ratio of the length of the protrusion to the thickness of the link plate is preferably at least 20% and at most 70%. In such a design of the chain link according to the invention, a substantially constant utilization cross section within the chain link is achieved.

Further details and advantages of the invention will be explained with the aid of the practical examples shown in the drawings, without the object of the invention being restricted to these concrete practical examples.

BRIEF DESCRIPTION OF THE PREFERRED EMBODIMENTS

DETAILED DESCRIPTION OF THE PREFERRED EMBODIMENTS

Figure 1:
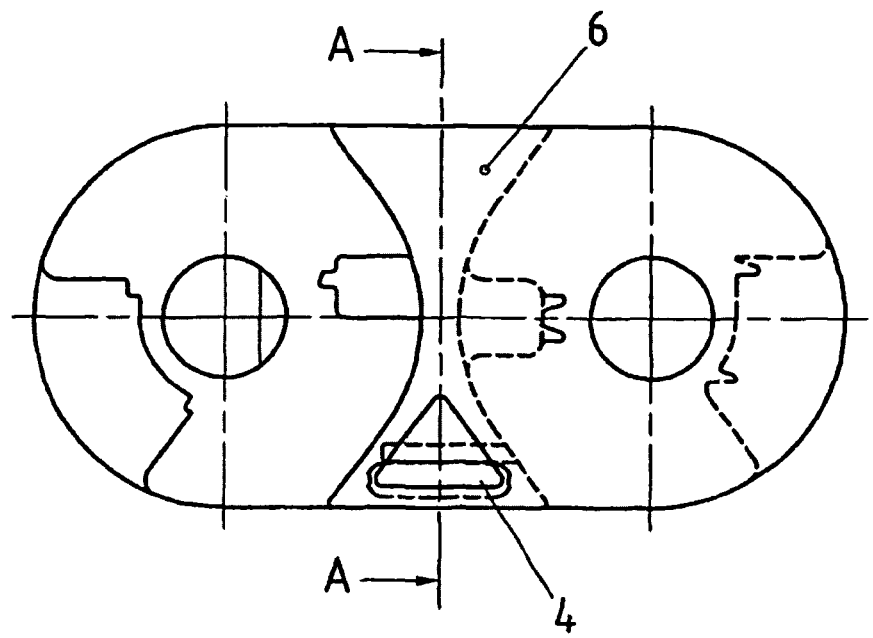
FIG. 1 shows a practical example of a chain link in a front view.
Figure 2:
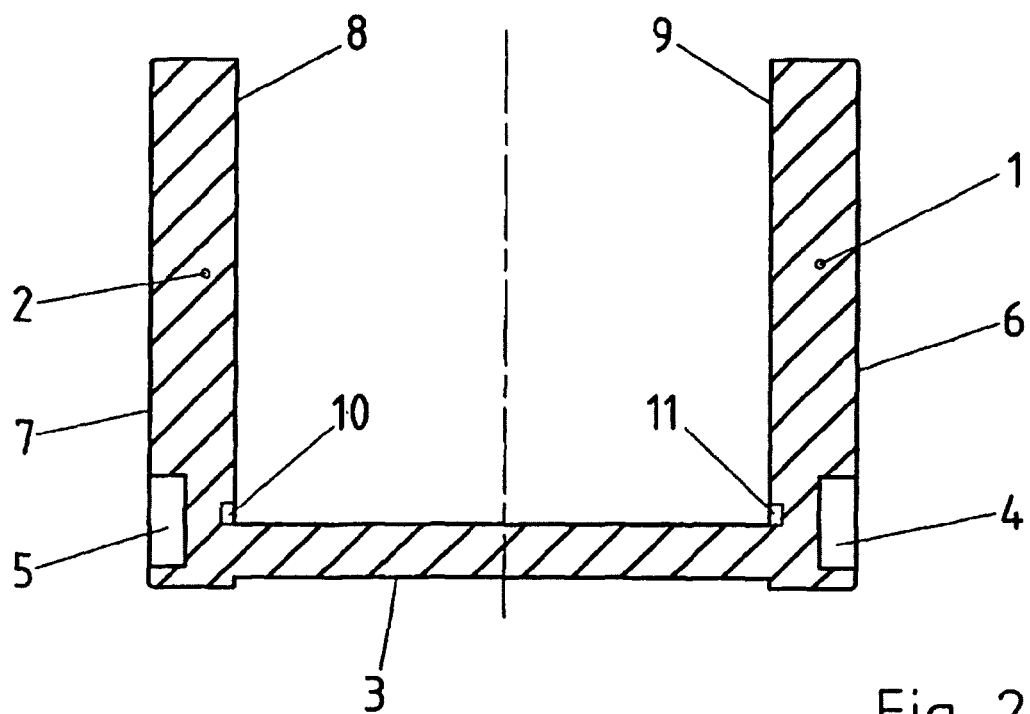
FIG. 2 shows the chain link in a side view and in cross section along the line A-A according to FIG. 1.

FIGS. 1 and 2 show a first practical example of a chain link of an energy drag chain for the guidance of cables, conduits, tubes or similar between a fixed and a mobile point of connection. The chain link is formed by two link plates 1 and 2, arranged at a distance from one another, and these are connected to each other with a cross piece 3. The link plates 1, 2 and the cross piece 3 form a unit that is manufactured in one piece from a plastic. It is not absolutely necessary that a uniform plastic be used both for the link plates as well as for the cross piece. It is also possible for the side link plates to be made at least partly from a first plastic while the cross piece is made of a second plastic.

For closure of chain link, a cross piece, which is not shown, is provided that is connected separably to at least one side link.

Each link has a first region in which a joint bolt is formed. In a second region that lies opposite to the first region, an articulated receptacle is provided. The articulated receptacle and the joint bolt are formed so that the link plates of neighboring links can be joined together. Hereby the joint bolts engage in the corresponding articulated receptacles of the link plates of a neighboring member.

In order to limit the swiveling motion of two neighboring chain links, stop surfaces are provided in the areas that interact with each other.

In the practical example shown, each link plate has a recess 4, 5 that is provided neighboring the connection region between a link plate 2, 3 and the cross piece 4. The recesses are formed on the outside 6 or 7 of link plates 1, 2. In the practical example shown, the recesses 4, 5 have an essentially triangular contour. The base of the triangular recess 4, 5 runs essentially parallel to the lower edge of link plates 1, 2. The recess extends into the link plate.

Furthermore, it can be seen from the representation in FIG. 2, that a recess is provided in link plate 1 or 2, that is formed on the inside 8, 9. The recesses 10, 11 follow on the top side of cross piece 3. These have an essentially rectangular cross section.

Through the recesses 4, 5, 10, 11, reduced manufacturing tolerance regarding the right angle between the individual link plates 1, 2 and the cross piece 3 is achieved. Through the use of the recesses 4, 5, 10, 11, it is achieved in an advantageous manner that the inside clear width within the chain link is essentially constant.

Figure 3:
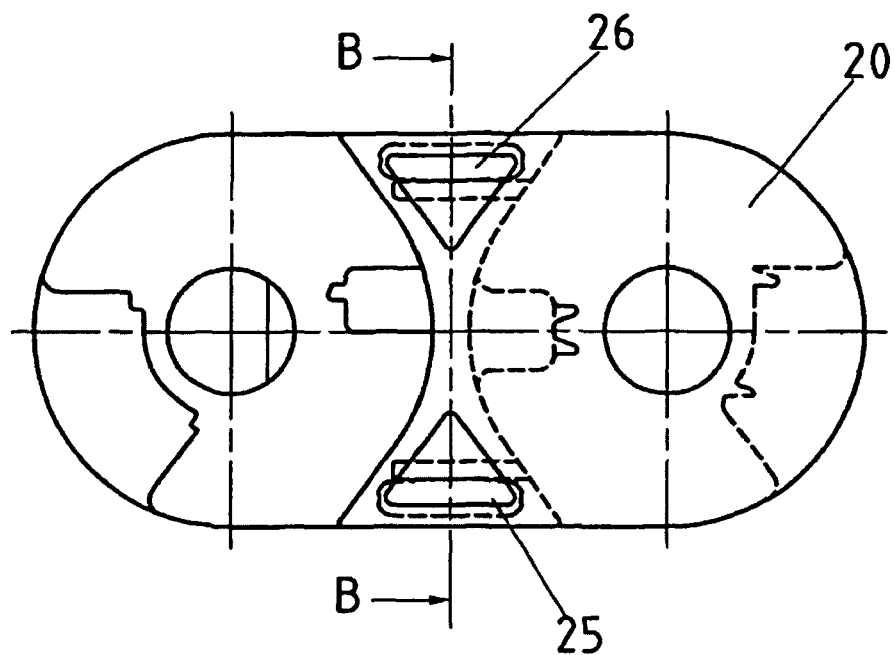
FIG. 3 shows a second practical example of a chain link in a front view.
Figure 4:
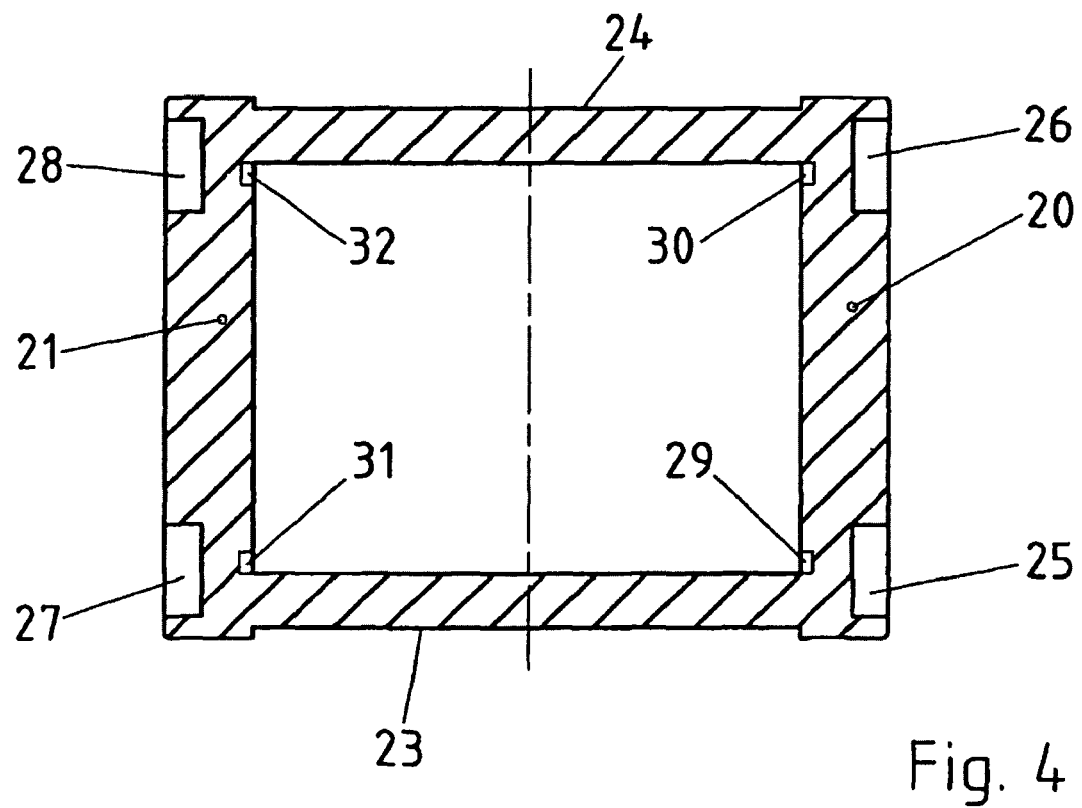
FIG. 4 shows the chain link according to FIG. 3 in a cross-sectional view along line B-B and in a side view.

A second practical example of a chain link is represented in FIGS. 3 and 4. In this embodiment of a chain link we are dealing with a closed chain link. It has two link plates 20, 21 that are arranged parallel to one another and that are joined together by cross pieces 23, 24. The chain link is made in one piece of at least one plastic.

The principle of the structure of the chain link corresponds to the structure of the chain link as is represented in FIGS. 1 and 2.

The chain link, as is represented in FIGS. 3 and 4, has recesses 25, 26, 27, 28 in link plates 20, 21. The recesses 25, 27 are formed in connection region between the link plate 20 or 21 and the cross piece 23, respectively, while the recesses 26, 28 are provided in the connection region between the link plates 20, 21 and the cross piece 24. The recesses have an essentially triangular shape. On the inside of link plates 20, 21, additional recesses 29, 30, 31, 32 are provided. The recesses have an essentially rectangular cross-section. Through the recesses, a reduction of the material in the connection region is achieved, so that during the cooling of the chain link after an injection process, no changes of the desired cross-section shape of the channel that is limited by the link plates and the cross links occurs.

Figure 5:
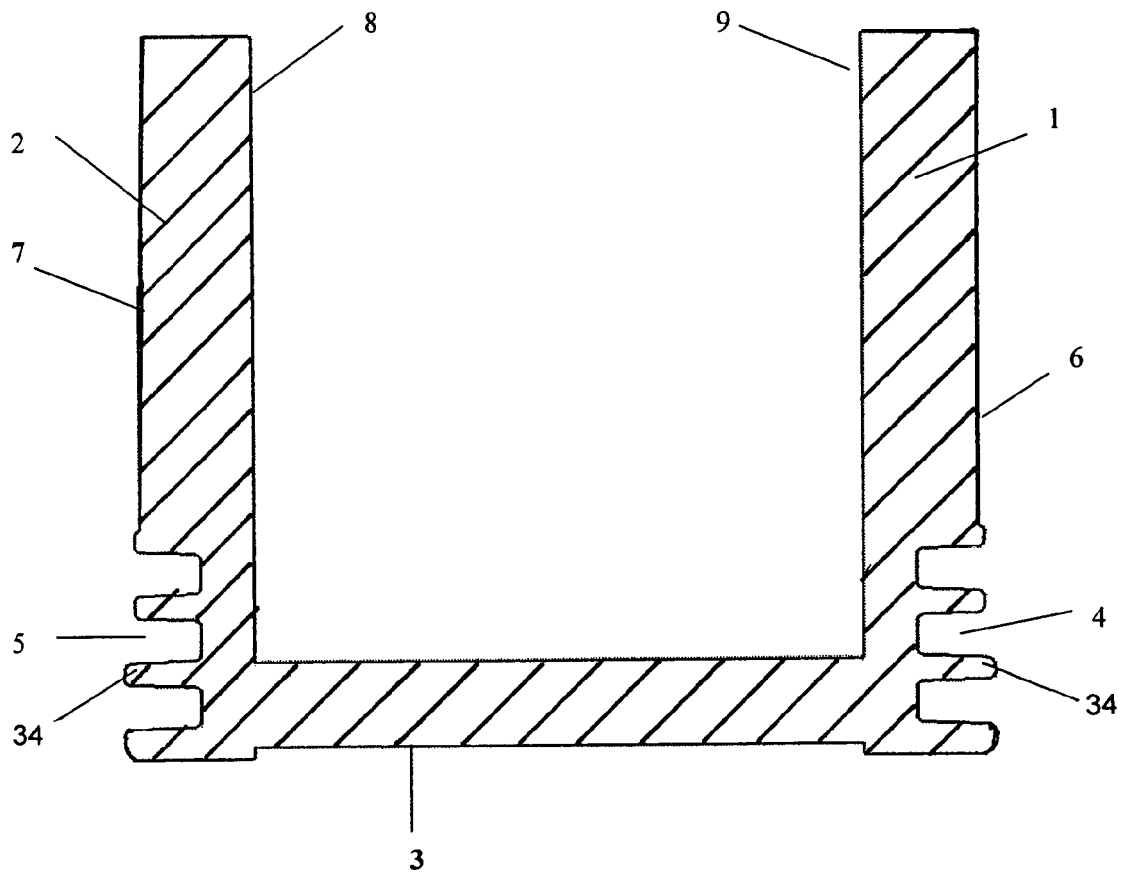
FIG. 5 shows a cross section of a third example of a chain link having protrusions, in accordance with the present invention.

The chain link in FIG. 5 is similar to the examples described above, except that it includes link plates 1 and 2, each having a protrusion 34 opposite the cross piece 3. The behavior of the chain link during cooling will be positively influenced by this protrusion in the sense that the angular accuracy between the link plates and the cross piece is increased. It is only necessary that one link plate have a protrusion formed on the outer side of the link plate and essentially opposite the cross piece to obtain increased angular accuracy.

The invention claimed is:

1. A chain link of an energy guide chain that extends between a fixed connection point and a mobile connection point, and the chain link is made from plastic and comprises:
two link plates spaced apart and integrally formed with a cross piece that connects the link plates through a connection region of each link plate, wherein at least one link plate has a protrusion formed on an outside surface of the link plate and the protrusion is arranged substantially opposite the cross piece.

2. The chain link according to claim 1, wherein the protrusion has a length dimension that is smaller than a length dimension of the cross piece.

3. The chain link according to claim 2, wherein a ratio of the length of the protrusion to the link plate thickness is between about 20% and about 70%.

* * * * *